United States Patent
Matsubara

(10) Patent No.: US 10,877,257 B2
(45) Date of Patent: Dec. 29, 2020

(54) PHASE CONTRAST MICROSCOPE

(71) Applicant: FUJIFILM Corporation, Tokyo (JP)

(72) Inventor: Kenta Matsubara, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 562 days.

(21) Appl. No.: 15/601,117

(22) Filed: May 22, 2017

(65) Prior Publication Data

US 2017/0322405 A1 Nov. 9, 2017

Related U.S. Application Data

(63) Continuation of application No. PCT/JP2015/080688, filed on Oct. 30, 2015.

(30) Foreign Application Priority Data

Nov. 26, 2014 (JP) .................... 2014-238677

(51) Int. Cl.
*G02B 21/14* (2006.01)
*G02B 3/14* (2006.01)
(Continued)

(52) U.S. Cl.
CPC ............. *G02B 21/14* (2013.01); *G02B 3/14* (2013.01); *G02B 21/025* (2013.01);
(Continued)

(58) Field of Classification Search
None
See application file for complete search history.

(56) References Cited

U.S. PATENT DOCUMENTS

2007/0188443 A1* 8/2007 Mehrl ............... G02B 26/0841
345/108
2012/0293644 A1* 11/2012 Fukutake .............. G02B 21/14
348/79
(Continued)

FOREIGN PATENT DOCUMENTS

JP          8-5929 A    1/1996
JP    2006-91506 A    4/2006
(Continued)

OTHER PUBLICATIONS

Japanese Notification of Reasons for Refusal, dated Dec. 5, 2017, for corresponding Japanese Application No. 2014-238677, with an English machine translation.
(Continued)

*Primary Examiner* — Darryl J Collins
*Assistant Examiner* — Journey F Sumlar
(74) *Attorney, Agent, or Firm* — Birch, Stewart, Kolasch & Birch, LLP

(57) ABSTRACT

The phase contrast microscope includes: an illumination optical system 10 that emits illumination light for phase difference measurement to an observation target placed in a container; an adjustment optical system 20 that is provided between the illumination optical system 10 and the observation target S, has at least one optical element 21, and adjusts refraction of the illumination light due to a liquid surface shape of a liquid C in the container 60; an imaging unit 40 that images the observation target to which the illumination light has been emitted; and an adjustment optical system control unit 51 that adjusts optical characteristics of the adjustment optical system 20 based on uniformity of a density of an image captured by the imaging unit 40 and a density contrast.

16 Claims, 7 Drawing Sheets

(51) Int. Cl.
- *G02B 21/08* (2006.01)
- *H04N 5/225* (2006.01)
- *H04N 5/232* (2006.01)
- *H04N 5/235* (2006.01)
- *G02B 21/36* (2006.01)
- *G02B 21/02* (2006.01)

(52) U.S. Cl.
CPC ........... *G02B 21/086* (2013.01); *G02B 21/36* (2013.01); *G02B 21/361* (2013.01); *H04N 5/2256* (2013.01); *H04N 5/2354* (2013.01); *H04N 5/23212* (2013.01); *H04N 5/232122* (2018.08); *H04N 5/232123* (2018.08)

(56) References Cited

U.S. PATENT DOCUMENTS

| | | | |
|---|---|---|---|
| 2014/0349332 A1* | 11/2014 | Yasuda | B01L 3/5085 435/29 |
| 2016/0209646 A1* | 7/2016 | Hattori | G02B 21/06 |

FOREIGN PATENT DOCUMENTS

| | | |
|---|---|---|
| JP | 2010-271537 A | 12/2010 |
| JP | 2015-152647 A | 8/2015 |
| JP | 2015-152648 A | 8/2015 |
| JP | 2015-152649 A | 8/2015 |
| JP | 2015-152650 A | 8/2015 |

OTHER PUBLICATIONS

International Preliminary Report on Patentability and English translation of Written Opinion of the International Searching Authority dated May 30, 2017, issued in PCT/JP2015/080688 (Forms PCT/IB/373 and PCT/ISA/237).

International Search Report (PCT/ISA/210) issued in PCT/JP2015/080688, dated Feb. 2, 2016.

Written Opinion of the International Searching Authority (PCT/ISA/237) issued in PCT/JP2015/080688, dated Feb. 2, 2016.

* cited by examiner

ADJUSTMENT OF
POSITION OF
OPTICAL ELEMENT

ADJUSTMENT OF
ROTATION OF
OPTICAL AXIS

ADJUSTMENT
OF FOCAL
POWER

FIG. 6
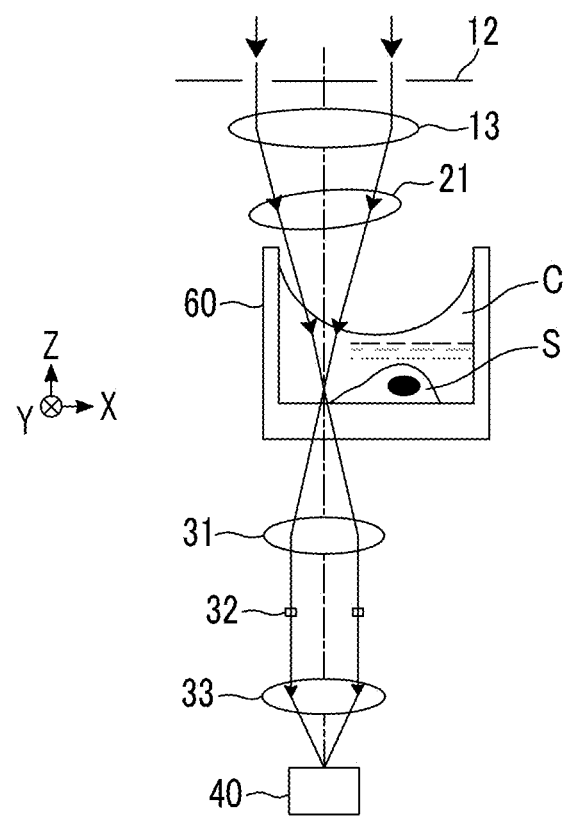
FIG. 7A   FIG. 7B   FIG. 7C   FIG. 7D   FIG. 7E
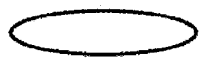    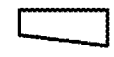

PHASE CONTRAST MICROSCOPE

CROSS-REFERENCE TO RELATED APPLICATIONS

This application is a Continuation of PCT International Application No. PCT/JP2015/080688 filed on Oct. 30, 2015, which claims priority under 35 U.S.C § 119 (a) to Japanese Patent Application No. 2014-238677 filed on Nov. 26, 2014. Each of the above application(s) is hereby expressly incorporated by reference, in its entirety, into the present application.

BACKGROUND OF THE INVENTION

1. Field of the Invention

The present invention relates to a phase contrast microscope for performing phase difference measurement of an observation target in liquid.

2. Description of the Related Art

In recent years, phase difference measurement has started to be widely used as a method for observing transparent cultured cells, such as stem cells, achromatically. A phase contrast microscope is used as one that performs such phase difference measurement.

In a general phase contrast microscope, ring-shaped illumination light is emitted to an observation target, and direct light and diffracted light having passed through the observation target are incident on a phase plate. Then, the direct light is attenuated by a ring portion of the phase plate, and the diffracted light passes through a transparent portion of the phase plate. By imaging the direct light and the diffracted light, it is possible to capture an image with a contrast of light and dark.

For example, in the case of observing cells or the like in a culture solution with a phase contrast microscope, a meniscus is formed on the liquid surface of the culture solution due to the influence of the surface tension of culture solution. Due to the lens action of the meniscus, the optical axis of the ring-shaped illumination light is shifted. Since this affects the direct light and the diffracted light incident on the phase plate, a clear phase difference image cannot be obtained.

FIGS. 10A and 10B show an example of an image obtained by imaging cells in a culture solution using a conventional phase contrast microscope. FIG. 10A is an entire image, and FIG. 10B is an enlarged image of a part of the entire image shown in FIG. 10A. As shown in FIGS. 10A and 10B, it can be seen that artifacts are generated at the center of the image due to the influence of the meniscus and the contrast of the cell image is low.

On the other hand, FIGS. 11A and 11B show an example of an image obtained by imaging cells without a culture solution using a conventional phase contrast microscope. FIG. 11A is an entire image, and FIG. 11B is an enlarged image of a part of the entire image shown in FIG. 11A. As shown in FIGS. 11A and 11B, in a case where there is no culture solution, a high-contrast cell image can be obtained, but it is not possible to continue the culture of cells without the culture solution.

Various methods have been proposed to suppress the influence of the meniscus of the culture solution described above. JP2010-271537A has proposed that the shape of a ring-shaped phase film at the pupil position of an objective lens and the shape of ring-shaped illumination light formed by an optical element are detected by a pupil image detector and the shape of a ring-shaped opening of the optical element is controlled based on the detected coordinate data.

JP2006-91506A has proposed that a correction lens with variable focal power for correcting the refraction of illumination light due to the meniscus and a light amount detection sensor, which has a ring-shaped opening and detects the intensity of light passing through the opening after passing through a phase plate, are provided and the focal power of the correction lens is controlled based on the intensity of light detected by the light amount detection sensor. JP1996-5929A (JP-H08-5929A) has proposed that a correction lens is provided as in JP2006-91506A and the focal power is controlled, for example, by using a plurality of correction lenses while performing switching therebetween.

SUMMARY OF THE INVENTION

In the method disclosed in JP2010-271537A, however, it is necessary to newly provide a pupil image detector. This leads an increase in cost and an increase in apparatus size.

Also in the method disclosed in JP2006-91506A, it is necessary to newly provide a light amount detection sensor. In addition, in the case of controlling the focal power of the correction lens based only on the intensity of light detected by the light amount detection sensor, it is not possible to perform high-accuracy adjustment.

Although JP1996-5929A (JP-H08-5929A) has proposed controlling the focal power by using a plurality of correction lenses while performing switching therebetween as described above, no method for automatically switching a plurality of correction lenses has been proposed.

In view of the aforementioned problem, it is an object of the present invention to provide a phase contrast microscope capable of automatically adjusting the refraction of illumination light due to a meniscus with high accuracy without increasing the cost or the apparatus size.

A phase contrast microscope of the present invention comprises: an illumination optical system that emits illumination light for phase difference measurement to an observation target placed in a container; an adjustment optical system that is provided between the illumination optical system and the observation target, has at least one optical element, and adjusts refraction of the illumination light due to a liquid surface shape of a liquid in the container; an imaging unit that images the observation target to which the illumination light has been emitted; and an adjustment optical system control unit that adjusts optical characteristics of the adjustment optical system based on uniformity of a density of an image captured by the imaging unit and a density contrast.

In the phase contrast microscope of the present invention described above, the adjustment optical system can comprise the optical element having focal power.

It is preferable that the optical element is capable of adjusting the focal power.

It is preferable that the optical element has a curvature on at least one of an incidence surface or an emission surface of the illumination light.

It is preferable that the optical element is capable of adjusting the curvature.

The adjustment optical system can comprise the optical element that is movable in at least one of an in-plane direction of a placement surface of the observation target or a direction perpendicular to the placement surface.

The adjustment optical system can comprise the optical element capable of rotationally adjusting an optical axis.

The adjustment optical system can comprise a plurality of the optical elements.

The adjustment optical system control unit can adjust the optical characteristics of the adjustment optical system by changing a combination of the plurality of optical elements.

The adjustment optical system control unit can adjust the optical characteristics of the adjustment optical system by switching the plurality of optical elements.

The adjustment optical system control unit can acquire adjustment conditions of the adjustment optical system and adjust the optical characteristics of the adjustment optical system based on the adjustment conditions.

It is preferable that the adjustment conditions are determined based on at least one of an optical magnification of an imaging optical system for forming an image of the observation target, a type of the container, a type of the observation target, the number of observation targets, a type of the liquid, an amount of the liquid, an environmental temperature, an environmental humidity, an imaging position in the container, or a size of an imaging field of view of the image of the observation target.

It is possible to further comprise a liquid surface shape measurement unit that measures a liquid surface shape of the liquid. In addition, adjustment conditions of the adjustment optical system can be acquired based on information of the liquid surface shape of the liquid measured by the liquid surface shape measurement unit, and the optical characteristics of the adjustment optical system can be adjusted based on the adjustment conditions.

The liquid surface shape measurement unit can acquire measurement conditions of the liquid surface shape based on at least one of a type of the container, a type of the observation target, the number of observation targets, a type of the liquid, an amount of the liquid, an environmental temperature, or an environmental humidity, and measure the liquid surface shape based on the acquired measurement conditions.

It is possible to further comprise a weight measurement unit that measures a weight of the liquid. In addition, adjustment conditions of the adjustment optical system can be acquired based on information of the weight of the liquid measured by the weight measurement unit, and the optical characteristics of the adjustment optical system can be adjusted based on the adjustment conditions.

The illumination optical system can have a light source and a slit plate in which a slit, through which light emitted from the light source is transmitted, is provided, and emit light transmitted through the slit plate to the observation target as the illumination light.

According to the phase contrast microscope of the present invention, the adjustment optical system that adjusts the refraction of illumination light due to the liquid surface shape of the liquid in the container is provided between the illumination optical system and the observation target, and the optical characteristics of the adjustment optical system are adjusted based on the uniformity of the density of the image captured by the imaging unit and the density contrast. Therefore, it is possible to automatically adjust the refraction of illumination light due to the liquid surface shape with high accuracy without increasing the cost or the apparatus size.

BRIEF DESCRIPTION OF THE DRAWINGS

FIG. 6 is a diagram illustrating the adjustment of an optical element in a case where the imaging position is shifted from the center position of a culture container.

FIGS. 7A to 7E are schematic diagrams of respective lenses in a case where an adjustment optical system is formed by a plurality of lenses.

DESCRIPTION OF THE PREFERRED EMBODIMENTS

Figure 1:
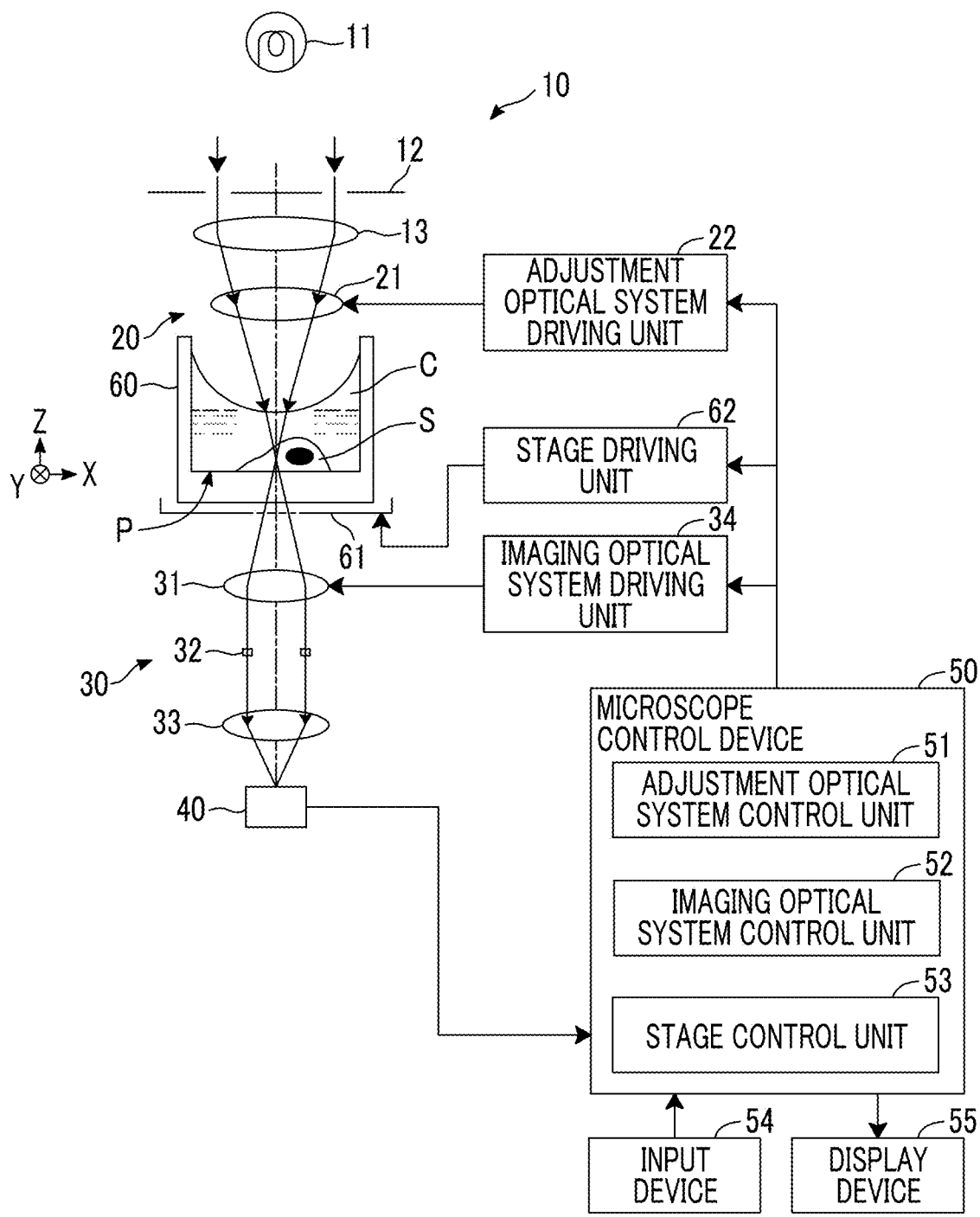
FIG. 1 is a diagram showing the schematic configuration of a microscope system using an embodiment of a phase contrast microscope of the present invention.

Hereinafter, a microscope system using an embodiment of a phase contrast microscope of the present invention will be described in detail with reference to the diagrams. FIG. 1 is a diagram showing the schematic configuration of the microscope system of the present embodiment.

As shown in FIG. 1, the microscope system of the present embodiment includes an illumination optical system 10, an adjustment optical system 20, an imaging optical system 30, an imaging unit 40, a microscope control device 50, an input device 54, and a display device 55. A stage 61 is provided between the adjustment optical system 20 and the imaging optical system 30, and a culture container 60 in which an observation target S is contained is provided on the stage 61. The microscope system of the present embodiment includes a stage driving unit 62 for moving the stage 61 in X and Y directions perpendicular to each other. The X and Y directions are directions perpendicular to each other on a plane parallel to an observation target placement surface P.

In the microscope system of the present embodiment, a phase contrast microscope body is formed by the illumination optical system 10, the adjustment optical system 20, the imaging optical system 30, the imaging unit 40, the stage 61, and the stage driving unit 62 that have been described above, and the microscope control device 50 controls the phase contrast microscope body. Hereinafter, the specific configuration of the phase contrast microscope body will be described.

The illumination optical system 10 emits illumination light for so-called phase difference measurement to the observation target S contained in the culture container 60. In the present embodiment, the illumination optical system 10 emits ring-shaped illumination light as the illumination light for phase difference measurement. Specifically, the illumination optical system 10 of the present embodiment includes: a white light source 11 (corresponding to a light source of the present invention) that emits white light; a slit plate 12 which has a ring-shaped slit, on which the white light emitted from the white light source 11 is incident, and which emits ring-shaped illumination light; and a first objective lens 13 on which the ring-shaped illumination light emitted from the slit plate 12 is incident and which emits the incident ring-shaped illumination light to the observation target.

Figure 2:
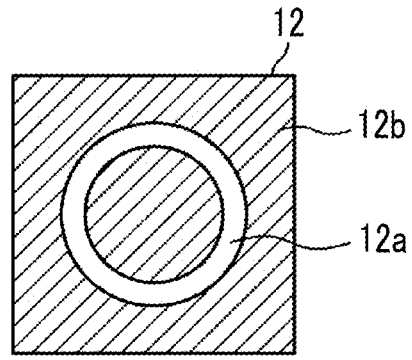
FIG. 2 is a diagram showing an example of the configuration of a slit plate.

FIG. 2 is a diagram showing the specific configuration of the slit plate 12. As shown in FIG. 2, the slit plate 12 is obtained by providing a ring-shaped slit 12a, through which white light is transmitted, on a light screen 12b for shielding the white light emitted from the white light source 11, and ring-shaped illumination light is formed by the white light passing through the slit 12a.

In the present embodiment, the ring-shaped illumination light is formed using the slit plate 12 as described above, but the method of forming the ring-shaped illumination light is not limited thereto. For example, the ring-shaped illumination light may be formed using a spatial light modulation element or the like.

In the present embodiment, the ring-shaped illumination light is used as illumination light for phase difference measurement, but illumination light having a structure other than the ring shape may be used. Other shapes, such as a triangular shape or a quadrangular shape, may be used as long as the illumination light has a conjugate shape with a phase plate to be described later.

The culture container 60 placed on the stage 61 has its bottom surface as the observation target placement surface P, and a cell group or the like as the observation target S is disposed on the observation target placement surface P. A culture solution C as a liquid is filled in the culture container 60, and a meniscus is formed in a concave shape on the liquid surface of the culture solution C as described above. Examples of the culture container 60 include a laboratory dish and a well plate in which a plurality of wells are arranged. In the case of a well plate, the observation target S and the culture solution C are contained in each well, and a meniscus is formed for each well.

In the present embodiment, the culture container 60 that contains the culture solution C and the observation target S under culture is an observation target. However, the observation target is not limited to those under culture, and a container that contains water or formalin-fixed cells may be an observation target. Also in this case, a meniscus is formed on the liquid surface of water or formalin in the container.

The adjustment optical system 20 is provided between the illumination optical system 10 and the observation target S. The adjustment optical system 20 adjusts the refraction of illumination light due to the liquid surface shape of the meniscus described above. The adjustment optical system 20 of the present embodiment includes an optical element 21 and an adjustment optical system driving unit 22.

The optical element 21 has a focal power. Specifically, a liquid crystal lens whose focal power is changed by voltage application, a liquid lens whose radius of curvature is changed, and a spatial light modulator capable of changing the focal length, and the like can be used. In a case where a lens is used as the optical element 21, a planoconvex lens having a curvature at the incidence surface or the emission surface may be used, or a biconvex lens having a curvature at both the incidence surface and the emission surface may be used.

The adjustment optical system driving unit 22 adjusts the focal length by changing the focal power of the optical element 21. Specifically, in a case where a liquid crystal lens or a spatial light modulator is used as the optical element 21, a voltage corresponding to a desired focal length is applied to the liquid crystal lens or the spatial light modulator. In a case where a liquid lens is used as the optical element 21, the amount of liquid in the liquid lens is adjusted according to a desired focal length, thereby adjusting the radius of curvature of the liquid lens.

Figure 3A:
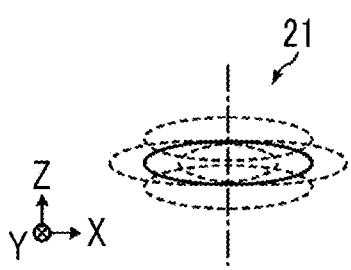
FIGS. 3A to 3C are diagrams schematically showing adjustments of the position of an optical element, rotation of an optical axis, and focal power.
Figure 3B:
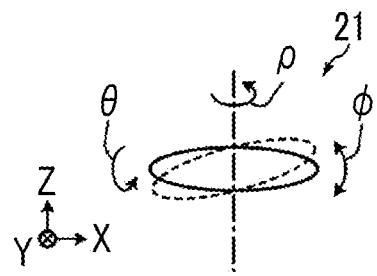
Figure 3C:
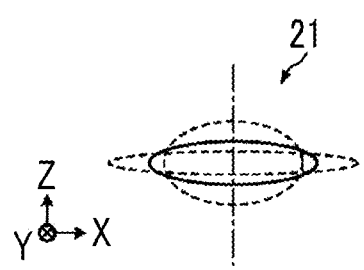

The adjustment optical system driving unit 22 includes a mechanism for changing the position of the optical element 21 and the optical axis direction of the optical element 21. Specifically, the adjustment optical system driving unit 22 includes a mechanism capable of changing the position of the optical element 21 in the X and Y directions and a Z direction perpendicular to the X and Y directions. The adjustment optical system driving unit 22 includes a mechanism for rotating the optical axis of the optical element 21. FIG. 3A is a diagram schematically showing a change in the position of the optical element 21 in the X, Y, and Z directions. FIG. 3B is a diagram schematically showing the rotation adjustment of ($\theta$) of the optical axis of the optical element 21 around the X axis, the rotation adjustment of ($\phi$) of the optical axis of the optical element 21 around the Y axis, and the rotation adjustment of ($\rho$) of the optical axis of the optical element 21 around the Z axis. FIG. 3C schematically shows the adjustment of the focal power of the optical element 21. Although FIG. 3C shows an example of adjusting the focal power by adjusting the radius of curvature of the optical element 21, the method of adjusting the focal power is not limited thereto. For example, in the case of using a liquid crystal lens or a spatial light modulator as the optical element 21, the focal power may be adjusted by adjusting the applied voltage.

In the present embodiment, the optical element 21 is moved in the X, Y, and Z directions. However, as long as the same operation as the optical operation by the movement of the optical element 21 can be obtained, the optical element 21 does not necessarily need to be moved. For example, in the case of using a liquid crystal lens or a spatial light modulator as the optical element 21, the same effect as the shift of the optical axis by the movement of the optical element 21 may be obtained by adjusting the applied voltage. Also in the optical axis direction of the optical element 21, it is not always necessary to rotate the optical element 21 itself, and the same effect as the rotation of the optical axis by the rotation of the optical element 21 itself may be obtained by adjusting the applied voltage.

In the present embodiment, the optical element 21 is moved in the X and Y directions. However, the present invention is not limited thereto, and the relative positional relationship between the optical element 21 and the meniscus, which is formed in the culture container 60, in the X and Y directions may be changed by moving the stage 61 in the X and Y directions.

Figure 4:
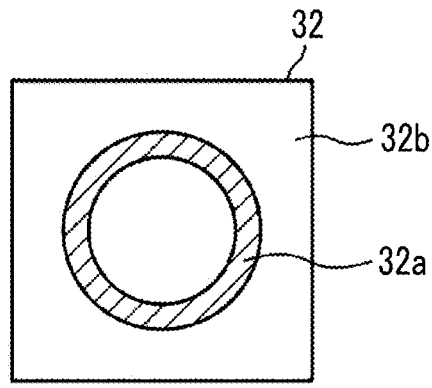
FIG. 4 is a diagram showing an example of the configuration of a phase plate.

The imaging optical system 30 includes a second objective lens 31, a phase plate 32, an imaging lens 33, and an imaging optical system driving unit 34. FIG. 4 is a plan view showing the specific configuration of the phase plate 32. As shown in FIG. 4, the phase plate 32 is obtained by forming a phase ring 32a in a transparent plate 32b that is transparent for the wavelength of ring-shaped illumination light. The size of the slit 12a described above and the phase ring 32a are in the conjugate relationship.

The phase ring 32a is obtained by forming a phase film, which is for shifting the phase of incident light by ¼ wavelength, and a neutral density filter, which is for attenuating incident light, in a ring shape. Direct light incident on the phase plate 32 is transmitted through the phase ring 32a. As a result, the phase of the direct light is shifted by ¼ wavelength, and the brightness is weakened. On the other hand, most of the diffracted light diffracted by the observation target S passes through the transparent plate 32b of the phase plate 32, and the phase and the brightness are not changed.

The second objective lens 31 is moved in the Z direction by the imaging optical system driving unit 34. Autofocus control is performed by the movement of the second objective lens 31 in the Z direction, so that the contrast of the image captured by the imaging unit 40 is adjusted.

Direct light and diffracted light having passed through the phase plate 32 are incident on the imaging lens 33, and an image of these light beams is formed on the imaging unit 40.

The imaging optical system driving unit 34 includes a mechanism for moving the second objective lens 31 in the Z direction as described above.

The imaging unit 40 includes an imaging element for capturing a phase difference image formed by the imaging lens 33. As the imaging element, a charge-coupled device (CCD) image sensor, a complementary metal-oxide semiconductor (CMOS) image sensor, and the like can be used.

The microscope control device 50 is a computer including a central processing unit (CPU) or a storage device. The microscope control device 50 controls the phase contrast microscope body described above. Specifically, the microscope control device 50 controls the operations of the adjustment optical system driving unit 22, the stage driving unit 62, and the imaging optical system driving unit 34.

The microscope control device 50 drives and controls the imaging element of the imaging unit 40, and acquires an image signal output from the imaging element. In a case where the microscope control device 50 is configured to be able to automatically change the optical magnification of the phase contrast microscope body, the microscope control device 50 controls the optical magnification. As a method of automatically changing the optical magnification, for example, a plurality of objective lenses having different magnifications may be provided in the imaging optical system 30, and the plurality of objective lenses may be automatically switched. At this time, the phase plate 32 is also changed according to the change of the objective lens. The optical magnification of the phase contrast microscope body may be changed by the user who manually changes the objective lens in the imaging optical system 30.

Specifically, the microscope control device 50 includes an adjustment optical system control unit 51 that controls the adjustment optical system driving unit 22, an imaging optical system control unit 52 that controls the imaging optical system driving unit 34, and a stage control unit 53 that controls the stage driving unit 62, as shown in FIG. 1.

The adjustment optical system control unit 51 and the imaging optical system control unit 52 control the adjustment optical system 20 and the imaging optical system 30 based on the image signal captured by the imaging unit 40. The control method will be described in detail later.

The input device 54 and the display device 55 are connected to the microscope control device 50. The input device 54 includes an input device, such as a keyboard or a mouse, and receives a setting input from the user. In particular, the input device 54 in the present embodiment receives a setting input of conditions for determining adjustment conditions used when adjusting the optical characteristics of the adjustment optical system 20. Specifically, the input device 54 receives the setting input of the optical magnification of the imaging optical system 30, the type of the culture container 60, the type of the observation target S, the number of observation targets S, the type of the culture solution C, the amount of culture solution C, an imaging position in the culture container 60, the size of the imaging field of view of the image of the observation target, and the like. The adjustment conditions will be described in detail later.

The display device 55 is a display device, such as a liquid crystal display, and displays an image formed by the imaging unit 40. By forming the display device 55 with a touch panel so that it is possible to perform setting input by pressing the screen, the display device 55 may also serve as an input device.

Figure 5:
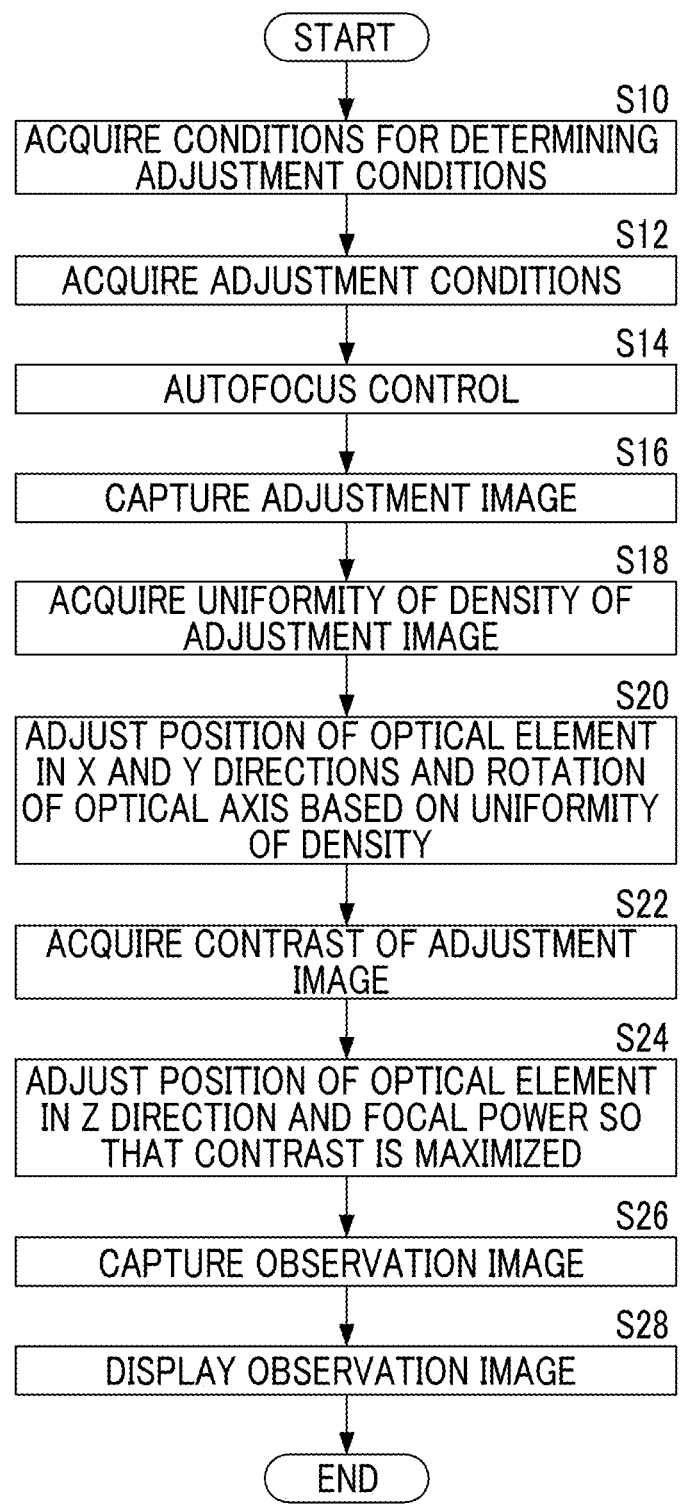
FIG. 5 is a flowchart illustrating the operation of the microscope system using an embodiment of the phase contrast microscope of the present invention.

Next, the operation of the microscope system of the present embodiment will be described with reference to the flowchart shown in FIG. 5.

First, the culture container 60 in which the observation target S and the culture solution C are contained is placed on the stage 61. Then, conditions for determining the adjustment conditions of the adjustment optical system 20 are acquired by the adjustment optical system control unit 51 (S10).

The adjustment conditions are conditions used when adjusting the optical characteristics of the adjustment optical system 20 to be described later. Specifically, the adjustment conditions are the initial setting value, the change adjustment amount, the upper limit of the number of times of change, and the like of the adjustment optical system 20.

The conditions for determining the adjustment conditions include the optical magnification of the imaging optical system 30, the type of the culture container 60, the type of the observation target S, the number of observation targets S, the type of the culture solution C, the amount of culture solution C, environmental temperature, environmental humidity, an imaging position in the culture container 60, the size of the imaging field of view of the image of the observation target S, and the like, and at least one of the conditions is acquired by the adjustment optical system control unit 51.

The above-mentioned conditions are conditions that affect the shape of the meniscus formed on the liquid surface of the culture solution C or the focal length of light refracted due to the meniscus. For example, for the type of the culture container 60, the shape of the meniscus differs depending on the size or depth of the culture container 60. Depending on the type of culture solution C, the shape of the meniscus differs depending on the viscosity or the like. In addition, the shape of the meniscus also differs depending on the amount of culture solution C. Depending on the environmental temperature or the environmental humidity, the viscosity of the culture solution C or the like changes, and the shape of the meniscus is different. In addition, depending on the type (size) or number of cells as the observation target S, the state of the liquid surface of the culture solution C changes, and the shape of the meniscus is different.

In a case where the imaging position in the culture container 60 is the center position of the culture container 60 as shown in FIG. 1 and a case where the imaging position in the culture container 60 is a position shifted from the center position as shown in FIG. 6, the shape of the meniscus at the imaging position is different. In addition, depending on the optical magnification of the imaging optical system 30 or the size of the imaging field of view, the focal length of light refracted due to the meniscus is different.

Therefore, first, the above-described conditions are acquired by the adjustment optical system control unit 51, and the adjustment optical system control unit 51 acquires the adjustment conditions (the initial setting value, the change adjustment amount, and the upper limit of the number of times of change) of the adjustment optical system 20 based on the acquired conditions (S12).

Specifically, as the initial setting value of the adjustment optical system 20, the adjustment optical system control unit 51 acquires an initial setting value when adjusting the position of the optical element 21 in the X, Y, and Z directions, an initial setting value when adjusting the rotation angle ($\theta$, $\phi$, $\rho$) of the optical axis of the optical element 21, and an initial setting value when adjusting the focal power of the optical element 21. As initial setting values when adjusting the focal power of the optical element 21, there are an initial setting value of a voltage applied to the liquid crystal lens or the spatial light modulator, an initial setting value of the amount of liquid injected into the liquid lens, and the like.

The adjustment optical system control unit 51 acquires a change adjustment amount and an upper limit of the number of times of change per one adjustment when adjusting the position of the optical element 21 in the X, Y, and Z directions, a change adjustment amount and an upper limit of the number of times of change per one adjustment when adjusting the rotation angle ($\theta$, $\phi$, $\rho$) of the optical axis of the optical element 21, and a change adjustment amount and an upper limit of the number of times of change per one adjustment when adjusting the focal power of the optical element 21.

The above-described adjustment conditions of the adjustment optical system 20 may be acquired by storing a table, in which conditions for determining adjustment conditions are associated with the adjustment conditions, in advance in the adjustment optical system control unit 51 and referring to the table.

By acquiring the adjustment conditions according to each condition as described above and limiting the adjustable range when adjusting the optical characteristics of the adjustment optical system 20, it is possible to shorten the adjustment time of the optical characteristic of the adjustment optical system 20 to be described later. In addition, since it is possible to narrow the adjustable range, it is possible to reduce the size.

Then, a control signal is output to the imaging optical system driving unit 34 from the imaging optical system control unit 52, and the imaging optical system driving unit 34 moves the second objective lens 31 of the imaging optical system 30 in the Z direction based on the input control signal. Then, image signals that are sequentially captured by the imaging unit 40 with the movement of the second objective lens 31 in the Z direction are sequentially input to the imaging optical system control unit 52, and the imaging optical system control unit 52 performs autofocus control based on the input image signals (S14). Specifically, the imaging optical system control unit 52 specifies the position of the second objective lens 31 at which the contrast of the input image signal is maximized, and sets the position of the second objective lens 31 to the specified position.

Then, after autofocus control is performed by the imaging optical system control unit 52, an adjustment image for adjusting the optical characteristics of the adjustment optical system 20 is captured by the imaging unit 40 (S16). The adjustment image captured by the imaging unit 40 is input to the adjustment optical system control unit 51.

The adjustment optical system control unit 51 acquires a feature quantity indicating the uniformity of the density of the input adjustment image (S18). Then, the adjustment optical system control unit 51 outputs a control signal to the adjustment optical system driving unit 22 in a case where the uniformity of the density of the adjustment image is not in an appropriate state.

Here, the state in which the uniformity of the density of the adjustment image is appropriate means, for example, a state in which a ring-shaped image appearing in the adjustment image has a substantially rotationally symmetrical shape. At this time, the ring-shaped image does not necessarily have a rotationally symmetrical shape, and may be adjusted so as to be closest to a rotationally symmetrical shape.

As the feature quantity of the adjustment image acquired at this time, for example, there is background information of the adjustment image. Specifically, a low-frequency component image is acquired by performing low pass filter processing on the adjustment image. Then, a ring-shaped image is extracted from the low-frequency component image, and the amount of deviation from rotational symmetry is calculated, for example, by pattern matching or the like. In a case where the amount of deviation is larger than a predetermined threshold value, a control signal is output to the adjustment optical system driving unit 22.

Then, based on the input control signal, the adjustment optical system driving unit 22 adjusts the position of the optical element 21 in the X and Y directions and the rotation of the optical axis of the optical element 21 by the change adjustment amount described above (S20).

Then, the adjustment image is acquired again by the imaging unit 40, and is input to the adjustment optical system control unit 51. The adjustment optical system control unit 51 acquires the feature quantity indicating the uniformity of the density of the input adjustment image again, and outputs a control signal to the adjustment optical system driving unit 22 again in a case where the uniformity of the density of the adjustment image is not in an appropriate state. Based on the input control signal, the adjustment optical system driving unit 22 adjusts again the position of the optical element 21 in the X and Y directions and the rotation of the optical axis of the optical element 21 by the change adjustment amount described above.

In this manner, the capturing of the adjustment image and the adjustment of the position of the optical element 21 in the X-Y direction and the rotation of the optical axis based on the feature quantity indicating the uniformity of the density of the adjustment image are repeatedly performed with the upper limit of the number of times of change as an upper limit, and the position of the optical element 21 in the X-Y direction and the rotation of the optical axis are adjusted such that the uniformity of the density of the adjustment image is in an appropriate state.

Then, after the adjustment of the position of the optical element 21 in the X-Y direction and the rotation of the optical axis is completed as described above, the adjustment optical system control unit 51 acquires a feature quantity indicating the contrast of the adjustment image (S22). Then, in a case where the contrast of the adjustment image is not in an appropriate state, the adjustment optical system control unit 51 outputs a control signal to the adjustment optical system driving unit 22, and the adjustment optical system driving unit 22 adjusts the position of the optical element 21 in the Z direction and the focal power of the optical element 21 by the above-described change adjustment amount based on the input control signal.

As a feature quantity indicating the contrast of the adjustment image, for example, a high-frequency component image is acquired by performing high pass filter processing on the adjustment image. Then, the contrast is calculated from the high-frequency component image, and a control signal is output to the adjustment optical system driving unit 22 in a case where the contrast is equal to or less than a predetermined threshold value.

Then, the adjustment image is acquired again by the imaging unit 40, and is input to the adjustment optical system control unit 51. The adjustment optical system control unit 51 acquires the feature quantity indicating the contrast of the input adjustment image again, and outputs a control signal to the adjustment optical system driving unit 22 again in a case where the contrast of the adjustment image is not in an appropriate state. Based on the input control signal, the adjustment optical system driving unit 22 adjusts again the position of the optical element 21 in the Z direction and the focal power of the optical element 21 by the change adjustment amount described above.

In this manner, the capturing of the adjustment image and the adjustment of the position of the optical element 21 in the Z direction and the focal power based on the feature quantity indicating the contrast of the adjustment image are repeatedly performed with the upper limit of the number of times of change as an upper limit, and the position of the optical element 21 in the Z direction and the focal power are adjusted such that the contrast of the adjustment image is in an appropriate state (S24).

Then, after the adjustment of the position of the optical element 21 in the Z direction and the focal power is performed, an observation image is captured by the imaging unit 40 (S26).

The observation image captured by the imaging unit 40 is input to the microscope control device 50, and the microscope control device 50 displays the input observation image on the display device 55 (S28).

According to the microscope system of the embodiment described above, the adjustment optical system 20 that adjusts the refraction of illumination light due to the meniscus of the culture solution C in the culture container 60 is provided between the illumination optical system 10 and the observation target S, and the optical characteristics of the adjustment optical system 20 are controlled based on the uniformity of the density of the image captured by the imaging unit 40 and the density contrast. Therefore, it is possible to automatically adjust the refraction of illumination light due to the meniscus with high accuracy without increasing the cost or the apparatus size.

In the microscope system of the embodiment described above, the focal power of the optical element 21 is adjusted by adjusting the voltage applied to the optical element 21 or the amount of liquid to be injected, but the present invention is not limited thereto. For example, a plurality of lenses with different radii of curvature as shown in FIGS. 7A to 7C may be provided as the adjustment optical system 20, and the focal power may be adjusted by automatically switching these lenses. As a method of rotating the optical axis of the optical element 21, for example, a plurality of lenses having different light emission angles as shown in FIGS. 7D and 7E may be provided, and the optical axis direction of the optical element 21 may be adjusted by automatically switching these lenses. By using a plurality of types of lenses shown in FIGS. 7A to 7E in combination, the focal power of the optical element 21 and the rotation of the optical axis may be adjusted.

In the microscope system of the embodiment described above, the focal power of the adjustment optical system 20 is adjusted. However, only the adjustment of the position of the optical element 21 in the X, Y, and Z directions and the adjustment of the rotation of the optical axis of the optical element 21 may be performed without performing the adjustment of the focal power.

In the microscope system of the embodiment described above, the adjustment conditions of the adjustment optical system 20 are acquired based on the conditions, such as the type of the culture container 60 or the optical magnification input by the user. However, the present invention is not limited thereto, and the shape of the meniscus (shape of the liquid surface) formed on the liquid surface of the culture solution C may be measured, and the adjustment conditions may be acquired based on the measurement result.

Figure 8:
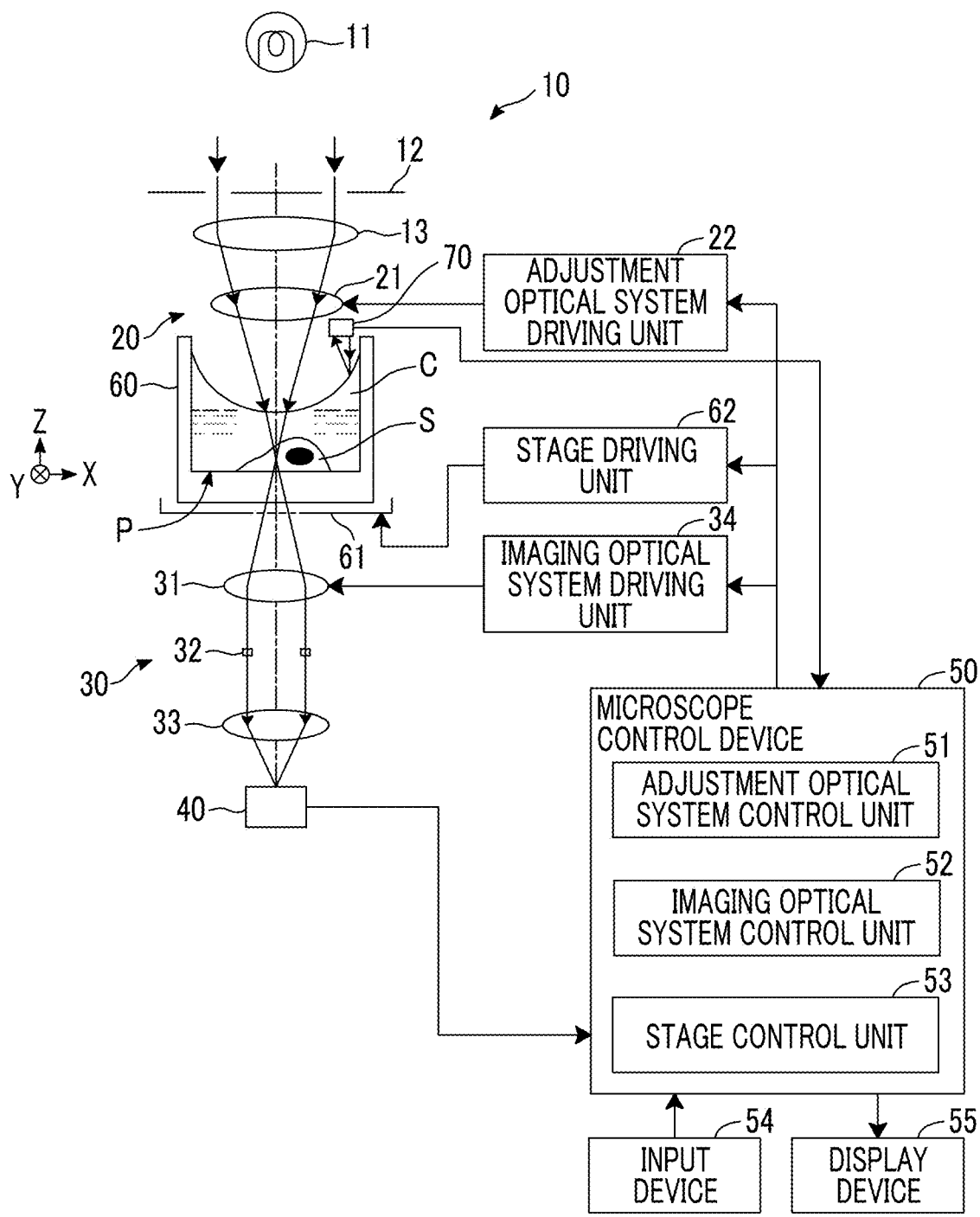
FIG. 8 is a diagram showing the schematic configuration of an embodiment in which the adjustment conditions of an optical element are acquired based on a liquid surface shape measured by a liquid surface shape measurement unit.

Specifically, for example, as shown in FIG. 8, a liquid surface shape measurement unit 70 for measuring the shape of the liquid surface of the culture solution C may be provided, and the adjustment optical system control unit 51 may calculate the curvature, height, angle, and the like of the liquid surface based on the measurement information from the liquid surface shape measurement unit 70 and acquire the adjustment conditions using these. As the curvature, height, and angle of the liquid surface, it is possible to calculate the average curvature, average height, and average angle of the liquid surface in the imaging region of the adjustment image. As the liquid surface shape measurement unit 70, for example, a laser displacement meter can be used. Therefore, the surface shape can be measured by continuously measuring the surface of the liquid surface. As a method for acquiring the adjustment conditions, for example, a table in which the curvature, height, and angle of the liquid surface are associated with the adjustment conditions may be stored in advance, or a function of outputting the adjustment conditions with the curvature, height, and angle of the liquid surface as inputs may be set in advance.

In addition, when measuring the shape of the liquid surface by the liquid surface shape measurement unit 70, measuring the liquid surface by searching for the liquid surface for the full width of the culture container 60 in the Z direction is inefficient and increases the size of the liquid surface shape measurement unit 70.

Therefore, for example, the liquid surface shape measurement unit 70 may acquire the measurement conditions of the liquid surface shape of the culture solution C based on at least one of the type of the culture container 60, the type of the observation target S, the number of observation targets S, the type of the culture solution C, the amount of culture solution C, environmental temperature, or environmental humidity, and measure the liquid surface shape based on the acquired measurement conditions. Information, such as the type of the culture container 60 described above, is information that affects the shape of the liquid surface of the culture solution C, and the information is set and input by the user using the input device 54.

Measurement conditions include a measurement range, a measurement center value, the number of measurement steps, and the like, and it is assumed that a table, in which the above-described information such as the type of the culture container 60 is associated with the measurement conditions, is stored in advance. For example, in a case where the well of the culture container 60 is small or a case where a liquid that easily causes a meniscus is used, it is assumed that the radius of curvature of the liquid surface is decreased. Accordingly, by reducing the measurement range and increasing the number of measurement steps, high-resolution measurement is performed. On the other hand, in a case where the well of the culture container 60 is large or a case where a liquid that is difficult to cause a meniscus is used, it is assumed that the radius of curvature of the liquid surface is increased. Accordingly, by increasing the measurement range and reducing the number of measurement steps, low-resolution measurement is performed.

For example, in the case of capturing a plurality of observation images by scanning the observation target S in a two-dimensional manner while moving the stage 61 in the X-Y direction, the shape of the liquid surface is measured at each position in the X-Y direction, and the adjustment conditions are acquired based on the measurement information. In the case of measuring the shape of the liquid surface at each position in the X-Y direction as described above, the measurement conditions may be acquired based on the above-described information, such as the type of the culture container 60, only in the case of measuring the shape of the liquid surface at the first position, and the measurement conditions may be acquired based on the previous measurement result (curvature, height, and angle of the liquid surface) for the second and subsequent measurements at other positions.

Figure 9:
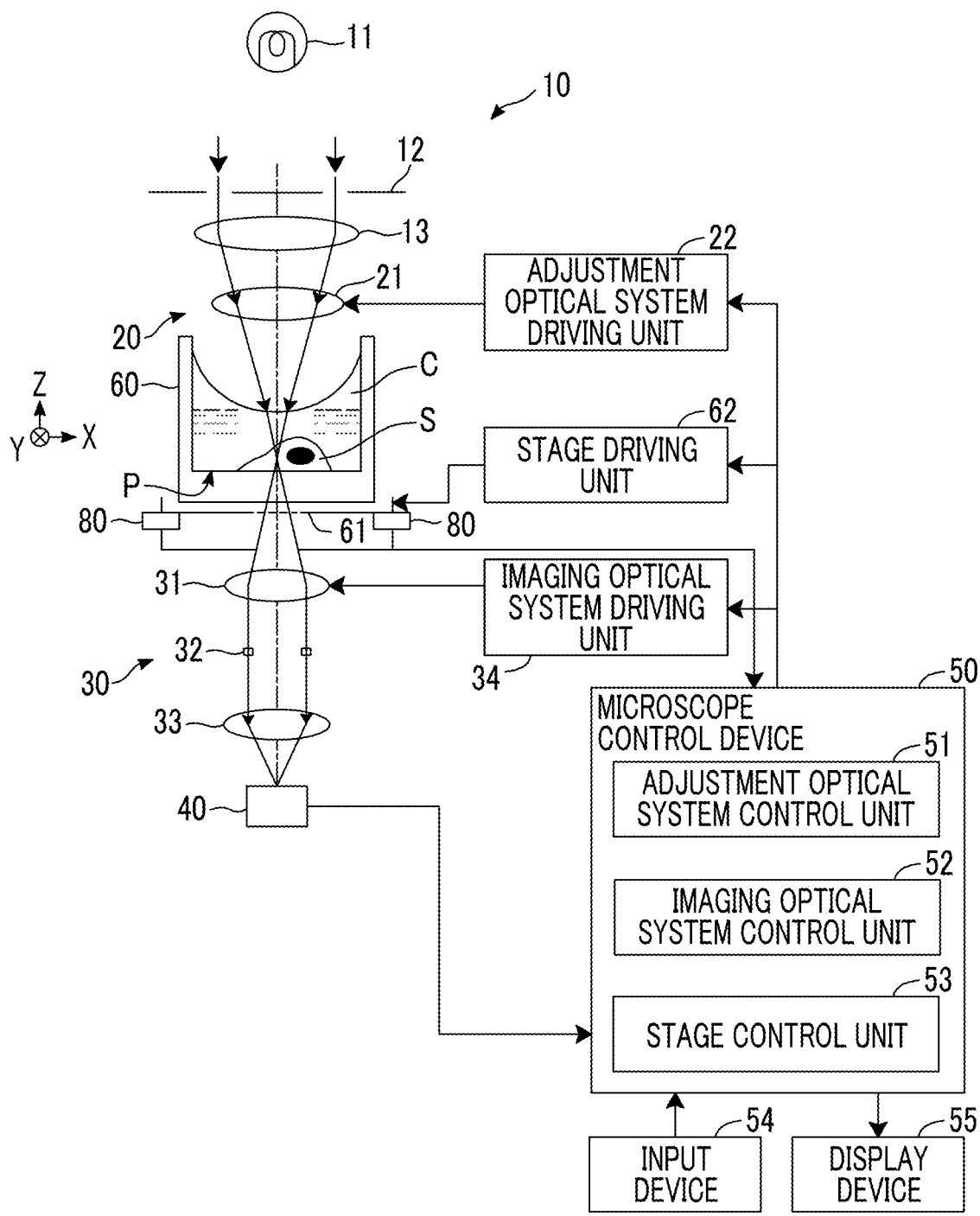
FIG. 9 is a diagram showing the schematic configuration of an embodiment in which the adjustment conditions of an optical element are acquired based on the weight of a culture solution measured by a weight measurement unit.
Figure 10A:
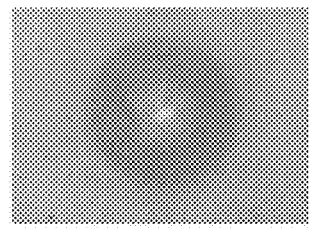
FIGS. 10A and 10B are diagrams showing an example of an image obtained by imaging cells in a culture solution using a conventional phase contrast microscope.
Figure 10B:
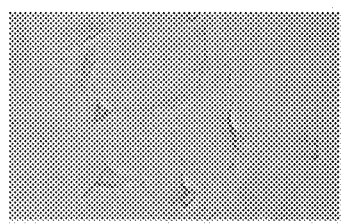
Figure 11A:
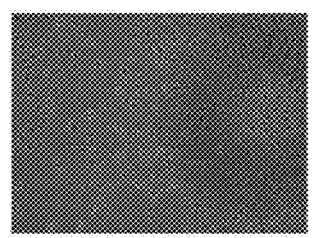
FIGS. 11A and 11B are diagrams showing an example of an image obtained by imaging cells without a culture solution using a conventional phase contrast microscope.
Figure 11B:

Instead of measuring the shape of the liquid surface of the culture solution C as described above, the weight of the culture solution C may be measured, and the adjustment conditions of the adjustment optical system 20 may be acquired based on the information of the weight of the culture solution C. Specifically, for example, as shown in FIG. 9, a weight measurement unit 80 for measuring the weight may be provided on the bottom surface of the stage 61, and the adjustment optical system control unit 51 may calculate the amount of the culture solution C based on the information of the weight measured by the weight measurement unit 80 and acquire the adjustment conditions of the optical element 21 based on the calculated amount of the culture solution C. As the weight measurement unit 80, a load cell type, electromagnetic type, or tuning fork type weight sensor can be used. Also in this case, a table in which the amount of the culture solution C and the adjustment conditions are associated with each other may be stored in advance, or a function of outputting the adjustment conditions with the amount of the culture solution C as an input may be set in advance.

EXPLANATION OF REFERENCES

10: illumination optical system
11: white light source
12: slit plate
12a: slit
12b: light screen
13: first objective lens
20: adjustment optical system
21: optical element
22: adjustment optical system driving unit
30: imaging optical system
31: second objective lens
32: phase plate
32a: phase ring
32b: transparent plate
33: imaging lens
34: imaging optical system driving unit
40: imaging unit
50: microscope control device
51: adjustment optical system control unit
52: imaging optical system control unit
53: stage control unit
54: input device
55: display device
60: culture container
62: stage driving unit
70: liquid surface shape measurement unit
80: weight measurement unit

What is claimed is:

1. A phase contrast microscope, comprising:
an illumination optical system that emits illumination light for phase difference measurement to an observation target placed in a container;
an adjustment optical system that is provided between the illumination optical system and the observation target, has at least one optical element, and adjusts refraction of the illumination light due to a liquid surface shape of a liquid in the container;
an imaging unit that images the observation target to which the illumination light has been emitted; and
an adjustment optical system control unit that adjusts optical characteristics of the adjustment optical system based on uniformity of a density of an image captured by the imaging unit and a density contrast,
wherein the adjustment optical system comprises the optical element having focal power,
wherein the optical element is capable of adjusting the focal power,
wherein the adjustment optical system control unit acquires adjustment conditions of the adjustment optical system, and adjusts the optical characteristics of the adjustment optical system based on the adjustment conditions, and
wherein the adjustment conditions are determined based on a type of the liquid and an amount of the liquid.

2. The phase contrast microscope according to claim 1, wherein the optical element has a curvature on at least one of an incidence surface or an emission surface of the illumination light.

3. The phase contrast microscope according to claim 2, wherein the optical element is capable of adjusting the curvature.

4. The phase contrast microscope according to claim 1, wherein the optical element has a curvature on at least one of an incidence surface or an emission surface of the illumination light.

5. The phase contrast microscope according to claim 4, wherein the optical element is capable of adjusting the curvature.

6. The phase contrast microscope according to claim 1, wherein the adjustment optical system comprises the optical element that is movable in at least one of an in-plane direction of a placement surface of the observation target or a direction perpendicular to the placement surface.

7. The phase contrast microscope according to claim 1, wherein the adjustment optical system comprises the optical element that is movable in at least one of an in-plane direction of a placement surface of the observation target or a direction perpendicular to the placement surface.

8. The phase contrast microscope according to claim 1, wherein the adjustment optical system comprises the optical element that is movable in at least one of an in-plane direction of a placement surface of the observation target or a direction perpendicular to the placement surface.

9. The phase contrast microscope according to claim 1, wherein the adjustment optical system comprises the optical element capable of rotationally adjusting an optical axis.

10. The phase contrast microscope according to claim 1, wherein the adjustment optical system comprises a plurality of the optical elements.

11. The phase contrast microscope according to claim 10, wherein the adjustment optical system control unit adjusts the optical characteristics of the adjustment optical system by changing a combination of the plurality of optical elements.

12. The phase contrast microscope according to claim 10, wherein the adjustment optical system control unit adjusts the optical characteristics of the adjustment optical system by switching the plurality of optical elements.

13. The phase contrast microscope according to claim 1, further comprising:
a liquid surface shape measurement unit that measures a liquid surface shape of the liquid,
wherein the adjustment optical system control unit acquires adjustment conditions of the adjustment optical system based on information of the liquid surface shape of the liquid measured by the liquid surface shape measurement unit, and adjusts the optical characteristics of the adjustment optical system based on the adjustment conditions.

14. The phase contrast microscope according to claim 13, wherein the liquid surface shape measurement unit acquires measurement conditions of the liquid surface shape based on at least one of a type of the container, a type of the observation target, the number of observation targets, a type of the liquid, an amount of the liquid, an environmental temperature, or an environmental humidity, and measures the liquid surface shape based on the acquired measurement conditions.

15. The phase contrast microscope according to claim 1, further comprising:
a weight measurement unit that measures a weight of the liquid,
wherein the adjustment optical system control unit acquires adjustment conditions of the adjustment optical system based on information of the weight of the liquid measured by the weight measurement unit, and adjusts the optical characteristics of the adjustment optical system based on the adjustment conditions.

16. The phase contrast microscope according to claim 1, wherein the illumination optical system has a light source and a slit plate in which a slit, through which light emitted from the light source is transmitted, is provided, and emits light transmitted through the slit plate to the observation target as the illumination light.

* * * * *